Aug. 28, 1962   P. LAVANCHY   3,051,588
PRODUCT AND METHOD OF MANUFACTURE
Filed April 10, 1959
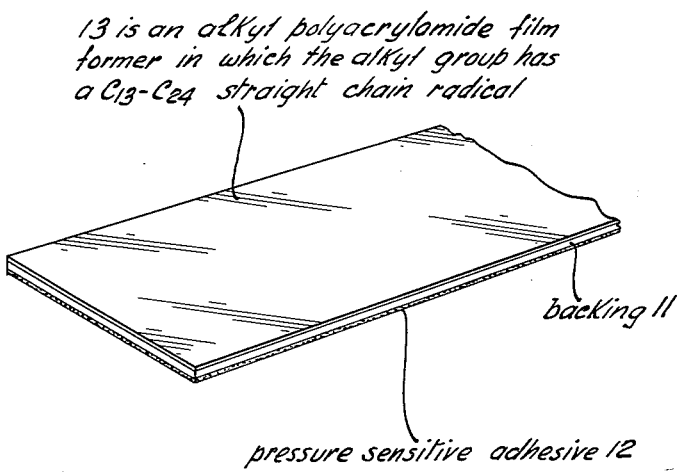
INVENTOR
PATRICIA LAVANCHY
BY
ATTORNEY 3,051,588
PRODUCT AND METHOD OF MANUFACTURE
Patricia Lavanchy, Wayne, Pa., assignor to Johnson & Johnson, a corporation of New Jersey
Filed Apr. 10, 1959, Ser. No. 805,356
6 Claims. (Cl. 117—68.5)

This invention relates to the art of release coatings, and more particularly to a release coating containing a N-alkyl polyacrylamide and pressure-sensitive adhesive tapes having such release coatings.

The term "backing," as used herein, means any suitable material for supporting the pressure-sensitive adhesive.

The term "pressure-sensitive adhesive," as used herein, means an elastomeric material, such as a natural or synthetic rubber, with or without a resinous component, which provides a normally aggressively tacky pressure-sensitive adhesive which can be applied with light finger pressure in the absence of heat and solvent.

The term "release coating," as used herein, means a thin coating applied to the opposite side of the backing material from the side which carries the pressure-sensitive adhesive, or to a liner, to permit easy unwinding after being rolled or stacked with the release material in contact with the pressure-sensitive adhesive of a superimposed layer of tape or a label.

Pressure-sensitive tapes are usually wound in rolls, thus bringing the backing in one layer into contact with the pressure-sensitive adhesive coating on the layer thereabove. This has a tendency to cause the upper layer to adhere to the next lower layer, making it difficult to unwind the tape because of the aggressively tacky character of the pressure-sensitive adhesive.

Release coatings are therefore usually applied to the backing of pressure-sensitive tapes in order to permit easy unwinding of the tape, without detackifying the pressure-sensitive adhesive coating or splitting the release coating.

Numerous attempts have been made to overcome these disadvantages, but many prior release coatings have been objectionable for various reasons. One very important reason is that after aging, especially at elevated temperatures, many release coatings lose their release properties. In other words, the release feature is fugitive. Examples of such release agents are paraffin wax coatings or emulsions.

Another objectionable feature in some prior art release coatings is that they lose their adhesiveness to the backing material and become detached therefrom, becoming attached to the pressure-sensitive side of the tape, and thereby lessening its adhesive characteristics.

A further objection to some prior release coatings is inadequate heat stability and solvent resistance.

I have discovered that these and other disadvantages of prior art release coatings can be overcome, and a release coating obtained which will not lose its release properties on aging, by applying a thin coating of an alkyl polyacrylamide film former, such as N-stearyl polyacrylamide or related materials, to the opposite side of the backing of pressure-sensitive tapes from the side which carries the pressure-sensitive adhesive.

It is therefore an object of this invention to provide a new and useful class of release coatings.

It is another object to provide pressure-sensitive tapes containing a normally aggressively tacky pressure-sensitive adhesive on one side, with a thin release coating on the opposite side, which will permit easy unwinding of the tape and not detackify the pressure-sensitive adhesive, nor be offset from the backing to the pressure-sensitive adhesive immediately thereabove.

It is a further object to provide a method of making pressure-sensitive adhesive tapes which maintain effective release characteristics on aging for long periods of time, even though subjected to elevated temperatures.

With the above and other objects in view, which will be apparent as the description proceeds, I have set forth my invention in the following specification and have illustrated certain embodiments thereof in the following examples, but it will be understood that this disclosure is merely for the purpose of illustrating practical embodiments of the invention, and the latter is not to be limited thereto.

*Example 1*

Thirty pound creped kraft saturating paper was impregnated with an equal weight of a latex mixture of 73 parts of Buna N (65 butadiene–35 acrylonitrile), 25 parts of GRS (50 butadiene–50 styrene), and 2 parts of a water soluble phenol formaldehyde resin. The paper was coated with about 0.2 ounce per square yard (dry weight) of a nitrocellulose coating solution. Over samples of the nitrocellulose coated paper were knifed 1% and 2% solutions, respectively, of the N-stearyl polyacrylamide release agent in a solvent mixture of 80 toluene and 20 methyl ethyl ketone. The backing was coated with 2.25 ounces per square yard of a typical crude rubber pressure-sensitive adhesive. The adhesion and the release from backing were measured on samples aged 1 month at 120° F., which represents a much longer aging period at room temperature. Adhesion was measured by the method described in ASTM D–1000. The release from backing was determined by measuring the force necessary to remove the tape from the roll at a speed of 150 feet per minute. All measurements were made on 1 inch wide tapes.

Adhesion to steel and release from backing results were as follows:

|  | Control | Solution of Release Agent | |
|---|---|---|---|
|  |  | 1% | 2% |
|  | Ounces | Ounces | Ounces |
| Adhesion to steel | 28 | 30 | 25 |
| Adhesion to steel (aged) | 28 | 30 | 25 |
| Release from backing | 28 | 27 | 24 |
| Release from backing (aged) | 115 | 50 | 47 |

The alkyl polyacrylamide used in this and the other examples was prepared by reacting polyacrylic acid $(CH_3CH_2COOH)_x$ and the corresponding alkyl amine (e.g. $C_{18}H_{37}NH_2$) in equimolecular proportions, using an aromatic solvent, such as xylene. The water evolved in the reaction is removed by azeotropic distillation during the reaction. The equation is as follows:

Polyacrylic acid and $C_{18}H_{37}NH_2$
→ stearyl polyacrylamide and water

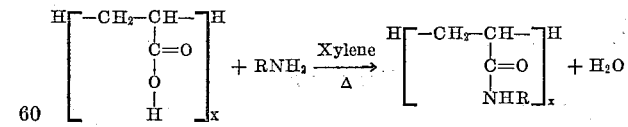

To 855 grams of stearyl amine (Armeen 18, Armour Chemical Co.) in 350 milliliters of xylene was added 845 grams of 27% polyacrylic acid in water (Acrysol A–1, Rohm & Haas Co.), equivalent to 228 grams of polyacrylic acid. The polyacrylic acid precipitated. The mixture was heated under reflux with stirring, adding more xylene as the reaction progressed until a total of 1520 milliliters was added. Foaming was controlled by raising the stirrer until it was at the liquid-foam interface. The solution became quite viscous as the reaction proceeded.

After 100 hours of refluxing about half the polyacrylic acid had been converted to N-stearyl polyacrylamide. The unreacted polyacrylic acid was separated and the product precipitated by pouring it into 4 liters of methanol. The precipitate was filtered off and washed twice with cold methanol, followed by drying overnight at 110° F. The yield was 223 grams or 21.8% of the theoretical.

| Analysis of product | Found | Theoretical for N-stearyl polyacrylamide |
|---|---|---|
| C | 76.8 | 78.0 |
| H | 12.2 | 12.8 |
| N | 4.49 | 4.33 |

*Example 2*

A 10% solution of N-stearyl polyacrylamide in toluene was coated by means of a coating knife on a cellophane tape backing, after which the sheet was passed through a drying oven to remove the solvent. The backing was coated with 1.0 ounce per square yard of a typical crude rubber pressure-sensitive adhesive.

Release values of this tape, as measured at 150 ft./minute unwind speed, were as follows:

Ounces
Release after aging 24 hours at room temperature___ 46
Release after aging 24 hours at 120° F_____ 40
Release after aging 24 hours at 150° F_____ 46

Thus good release was maintained despite subjection of the tape to high temperatures for 24 hours.

The samples all exhibited excellent pressure-sensitive tack.

*Example 3*

A 27 pound creped paper, saturated with a standard latex impregnant as disclosed in Eger-Engel Patent No. 2,726,967, was coated with a standard nitrocellulose coating of about 0.2 ounce per square yard. Over samples of this there were knife-coated 1% and 3% toluene solutions, respectively, of stearyl polyacrylamide, the opposite face of the tape backing being coated with 2.25 ounces per square yard of the following adhesive:

Parts by weight
Pale crepe _____ 35.0
GRS (71 butadiene 29 styrene) (60 Mooney) _____ 6.5
Aluminum hydrate filler _____ 21.0
Polyterpene resin, M.P. 115° C _____ 36.5
Santovar A antioxidant (2,5-ditertiary amyl hydroquinone) _____ 1.0

This tap unwound easily.

*Example 4*

A tape with good release properties can be made by knife-coating a 2% solution of the N-stearyl polyacrylamide on a 1.5 mil cellophane film. The opposite face of the tape can be coated with a primer as disclosed in Billings 2,340,298. This will serve as a very satisfactory backing for a pressure-sensitive tape with easy unwind characteristics.

*Example 5*

A 1 mil polyethylene terephthalate backing can be knife-coated with a 3% solution of N-stearyl polyacrylamide, and coated on the opposite surface with a priming coat as disclosed in Bemmels Patent No. 2,647,843. When this backing is coated with a suitable electrical grade of pressure-sensitive adhesive, an electrical tape is provided with easy unwind characteristics.

*Example 6*

A satisfactory masking tape having easy unwind characteristics can be made by coating the latex impregnated kraft saturating paper described in Example 1 with 0.3 ounce per square yard of a polyamide backsize and overcoating by knife with a 1.5% solution (80 toluene and 20 methyl ethyl ketone) of myristyl polyacrylamide

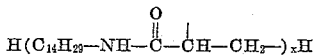

The opposite side of the tape was coated with a normal pressure-sensitive adhesive based on a reclaimed rubber composition.

*Example 7*

A satisfactory film tape can be made by knife coating a 1 mil "nylon" film with a 10% solution in toluene of carnaubyl polyacrylamide

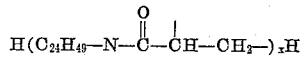

The opposite side of the tape was coated with 1 ounce per square yard of a normal rubber base pressure-sensisive adhesive.

This tape has easy unwind characteristics.

The N-stearyl polyacrylamide used in Examples 1–5 was made by reacting equimolecular proportions of polyacrylic acid and stearyl amine in xylene, as discussed under Example 1, with the elimination of water. The polyacrylamides used in Examples 6 and 7 can be made in a similar way.

The N-alkyl polyacrylamide can also be made in other ways, as by reacting:

(a) A polyacrylamide and an alkyl amine to give the N-alkyl polyacrylamide and ammonia:

Polyacrylamide and $C_{18}H_{37}NH_2 \rightarrow$
    stearyl polyacrylamide and ammonia

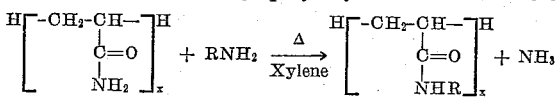

(b) A polyacryloyl chloride and an alkyl amine to give the N-alkyl polyacrylamide and hydrochloric acid:

Polyacryloyl chloride and $C_{18}H_{37}NH_2 \rightarrow$
    Stearyl polyacrylamide and hydrochloric acid

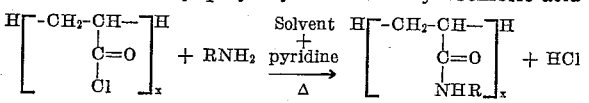

Although the above examples are limited to the use of N-stearyl, N-myristyl and N-carnaubyl polyacrylamide release coatings, other polyacrylamide release coatings disclosed in the following paragraph may be substituted for these polyacrylamide coatings, using equimolecular proportions and obtaining similar results.

The polyacrylamides which are useful in this invention are those having a side chain length of more than 12 carbon atoms. I prefer to use polyacrylamide in which the carbon length is from $C_{13}$ to $C_{24}$, and most desirably about $C_{18}$. These polyacrylamides are represented by the general formula

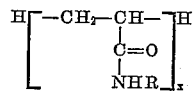

in which R is hydrogen or an alkyl group, and at least 50% of the R's are a straight chain aliphatic hydrocarbon group of $C_{13}$–$C_{24}$, and where $x$ is greater than 100, and preferably greater than 500.

The polyacrylamide coatings of this invention are applied from dilute solution by any of the standard coating techniques, as by knife-coating, roller coating, or calendering, after which the sheet is passed through a drying oven to remove solvent. The degree of fatty amide substitution on the chain should range from 50–100%.

In addition to containing the polyacrylamide, the release coatings can also contain copolymers with acrylic acid, such as acrylonitrile, acrylates, styrene, butadiene, etc., which contain a major proportion of the acrylic acid.

The backing to which my improved release agents are applied may be a kraft or rope saturating paper that has been impregnated with a latex mixture and then coated with a customary backsize solution (e.g. nitrocellulose), as in Example 1, or cellophane as in Example 2, or a polyethylene terephthalate as in Example 5, or it may be any of the conventional film forming backing materials used in the art, such as cellulose acetate, vinyl chloride or ethyl cellulose, or a paper or cloth which is coated with an alkyd resin, vinyl chloride, nitrocellulose, or other normal plastic coating.

The thickness of the release coating may vary but is very thin, examples of suitable coating weights being as follows:

|  | Ounces per square yard |
|---|---|
| 10% solution on cellophane | 0.01 |
| 1% solution on crepe paper | 0.01 |
| 2% solution on crepe paper | 0.02 |

The normally tacky and pressure-sensitive adhesive may be any of those used in the art, examples being compositions containing an elastomeric component, which is usually a natural or synthetic rubber, or similar elastomeric polymer, and a resinous component compatible with the binder and adapted to impart tack to the adhesive composition, together with suitable amounts of various types of additives, such as conventional fillers, antioxidants, etc.

A typical normally tacky and pressure-sensitive adhesive is as follows:

|  | Parts |
|---|---|
| Pale crepe rubber | 100 |
| Zinc oxide | 85 |
| Polyterpene resin (M.P. 115° C.) | 41 |
| Polyterpene resin (M.P. 70° C.) | 41 |
| 2,5-ditertiary amyl hydroquinone | 2 |
| Lanolin | 10 |
| Lecithin | 1 |

A typical normally tacky and pressure-sensitive electrical grade adhesive is as follows:

|  | Parts |
|---|---|
| Pale crepe rubber | 50 |
| GRS 1022 (71/29 butadiene styrene copolymer) | 50 |
| Zinc oxide | 85 |
| Polyterpene resin (M.P. 115° C.) | 30 |
| Glycerol ester of hydrogenated rosin | 40 |
| Zinc resinate | 10 |
| Octylphenol formaldehyde resin | 10 |
| 2,5-ditertiary amyl hydroquinone | 2 |

It will therefore be apparent that the release coatings of this invention anchor well to base materials, and particularly to nitrocellulose-coated paper, cellophane or ethylene terephthalate films. After aging, even at 120° F. for one month, they still preserve the easy release properties they possess immediately after coating. Furthermore, they do not impair the tackiness of the pressure-sensitive adhesive coating.

It is believed these excellent results are due to the use of an alkyl polyacrylamide coating which is a polymeric material with very limited solubility in the adhesive, which therefore has no tendency to cause detackification or give fugitive release properties as monomeric materials or paraffin waxes have been found to do.

The release agents and coated tapes of this invention are characterized by having good release characteristics, not only immediately after coating, but after ageing for a month at 120° F., which corresponds to a much longer aging period at room temperature. They do not cause detackification or impairment of the pressure-sensitive adhesives with which they come in contact, and the base material and pressure-sensitive adhesive may be any of the materials now in general use for pressure-sensitive adhesive tapes.

A further advantage of the release agents of this invention is that they may be compounded with aldehyde resins, such as phenol-formaldehyde, urea-formaldehyde, or melamine-formaldehyde, to give a cured release backsize with further improved solvent and heat resistance and bonding to the base coat.

In the accompanying drawing the FIGURE is a fragmental perspective view of a tape embodying the present invention. In this figure 11 is a backing, 12 is a pressure-sensitive adhesive applied to one side of the backing, and 13 is an alkyl polyacrylamide film-former which is appled to the opposite side of the backing 11 and in which the alkyl group has a $C_{13}$–$C_{24}$ straight chain radical.

Although I have hereinbefore referred to pressure-sensitive adhesive tapes, it will be understood that this invention is not limited to tapes, but may be applied to labels or any materials having a layer of pressure-sensitive adhesive in contact with the release side of an interliner, or my release coatings may be applied to both sides of a liner adapted to be inserted between adjacent layers of pressure-sensitive adhesive tape or other material that has been coated with adhesive on both sides.

It is apparent that many widely different embodiments of this invention may be made without departing from the spirit and scope thereof; and, therefore, it is not intended to be limited except as indicated in the appended claims.

I claim:

1. A pressure-sensitive adhesive tape comprising a backing selected from the group consisting of paper, cloth and film materials, a coating of pressure-sensitive adhesive on one major side of said backing, and, on the opposite side of said backing, a release coating consisting essentially of an alkyl polyacrylamide film former which contains the following recurring formula:

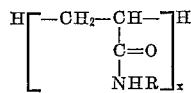

where R is a member of the group consisting of hydrogen and an alkyl group, and at least 50% of the R's are straight chain alkyl groups of $C_{13}$–$C_{24}$, and where $x$ is greater than 100.

2. The pressure-sensitive adhesive tape of claim 1, where R is $C_{18}H_{37}$—.

3. The pressure-sensitive adhesive tape of claim 2, where $x$ is greater than 500.

4. The method of making a pressure-sensitive adhesive tape having good release characteristics when rolled upon itself, which comprises (a) coating one side of a backing selected from the group consisting of paper, cloth and film materials with a pressure-sensitive adhesive, (b) coating the other side with a release coating consisting essentially of an alkyl polyacrylamide film former which contains the following recurring formula:

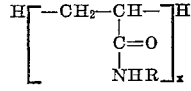

where R is a member of the group consisting of hydrogen and an alkyl group, and at least 50% of the R's are straight chain alkyl groups of $C_{13}$–$C_{24}$, and where $x$ is greater than 100, and (c) drying the release coating.

5. The method of claim 4, in which the release coating is applied from a solution containing not over 2% of the release agent in an organic solvent.

6. The method of claim 5, in which the organic solvent is toluene.

References Cited in the file of this patent
UNITED STATES PATENTS

| 2,387,501 | Dietrich | Oct. 23, 1945 |
| 2,734,503 | Doyle | Feb. 14, 1956 |
| 2,799,596 | Frantz | July 16, 1957 |
| 2,803,607 | Stroh et al. | Aug. 20, 1957 |
| 2,914,167 | Holtz | Nov. 24, 1959 |